(12) United States Patent
Sadler (10) Patent No.: US 8,838,312 B2
(45) Date of Patent: Sep. 16, 2014

(54) ELECTRIC VEHICLE (75) Inventor: Lawrence R. Sadler, Palmetto, FL (US)

(73) Assignee: L.R.S. Innovations, Inc., Palmetto, FL (US)

( * ) Notice: Subject to any disclaimer, the term of this patent is extended or adjusted under 35 U.S.C. 154(b) by 74 days.

(21) Appl. No.: 13/532,737

(22) Filed: Jun. 25, 2012

(65) Prior Publication Data
US 2012/0330488 A1   Dec. 27, 2012

Related U.S. Application Data (60) Provisional application No. 61/500,744, filed on Jun. 24, 2011.

(51) Int. Cl.
  *B60L 11/12* (2006.01)
  *B60W 20/00* (2006.01)
(52) U.S. Cl.
  USPC ............................... 701/22; 701/36; 320/119
(58) Field of Classification Search
  USPC .............. 701/22, 1, 36; 320/119; 180/65.245; 307/46, 82
  See application file for complete search history.

(56) References Cited

U.S. PATENT DOCUMENTS

| | | |
|---|---|---|
| 3,517,766 A | 6/1970 | West |
| 4,199,037 A | 4/1980 | White |
| 4,307,325 A | 12/1981 | Saar |
| 4,317,176 A | 2/1982 | Saar et al. |
| 4,412,158 A | 10/1983 | Jefferson et al. |
| 4,503,370 A | 3/1985 | Cuneo |
| 4,905,579 A | 3/1990 | Dame |
| 5,214,358 A | 5/1993 | Marshall |
| 5,345,761 A | 9/1994 | King et al. |
| 5,406,126 A | 4/1995 | Hadley et al. |
| 5,498,950 A | 3/1996 | Ouwerkerk |
| 5,563,482 A | 10/1996 | Shaw et al. |
| 5,650,713 A | 7/1997 | Takeuchi et al. |
| 5,754,019 A | 5/1998 | Walz |
| 5,778,997 A | 7/1998 | Setaka et al. |
| 5,786,640 A | 7/1998 | Sakai et al. |

(Continued)

FOREIGN PATENT DOCUMENTS

| | | |
|---|---|---|
| JP | 08289407 | 11/1996 |
| JP | 2000014031 | 1/2000 |

(Continued)

OTHER PUBLICATIONS

U.S. Appl. No. 12/590,072 Office Action dated Aug. 16, 2012.

(Continued)

*Primary Examiner* — Tan Q Nguyen
(74) *Attorney, Agent, or Firm* — Kunzler Law Group (57) ABSTRACT

An electric vehicle that includes a hydrocarbon engine coupled with a generator, the generator comprising a positive source connection and a neutral source connection. The electric vehicle further includes a plurality of interconnected electrical energy storage devices, each electrical energy storage device comprising a positive terminal and a neutral terminal. Also included is a switching subsystem configured to successively electrically connect each electrical energy storage device to the generator for a selected time interval in a repeating cycle by electrically connecting the positive source connection of the generator to the positive terminal of an electrical energy storage device and electrically connecting the neutral source connection of the generator to the neutral terminal of the electrical energy storage device. The electric vehicle also includes a motor for propelling the vehicle.

28 Claims, 7 Drawing Sheets

(56) References Cited

U.S. PATENT DOCUMENTS

| | | | |
|---|---|---|---|
| 5,798,584 A | 8/1998 | Schaeffeler et al. |
| 5,848,659 A | 12/1998 | Karg et al. |
| 5,969,624 A | 10/1999 | Sakai et al. |
| 6,018,694 A | 1/2000 | Egami et al. |
| 6,105,697 A | 8/2000 | Weaver |
| 6,326,765 B1 | 12/2001 | Hughes et al. |
| 6,346,794 B1 | 2/2002 | Odaohhara |
| 6,481,516 B1 | 11/2002 | Field et al. |
| 6,583,603 B1 | 6/2003 | Baldwin |
| 6,668,954 B2 | 12/2003 | Field |
| 6,815,929 B1 | 11/2004 | Dagan et al. |
| 6,857,492 B1 | 2/2005 | Liskey et al. |
| 6,897,575 B1 | 5/2005 | Yu |
| 6,982,499 B1 | 1/2006 | Kachi et al. |
| 6,983,212 B2 | 1/2006 | Burns |
| 7,019,413 B2 | 3/2006 | Kinoshita |
| 7,122,979 B2 | 10/2006 | Wilton et al. |
| 7,126,312 B2 | 10/2006 | Moore |
| 7,147,069 B2 | 12/2006 | Maberry |
| 7,183,746 B1 | 2/2007 | Carter |
| 7,245,108 B2 | 7/2007 | Chertok et al. |
| 7,291,934 B2 | 11/2007 | Bernardi et al. |
| 7,378,818 B2 | 5/2008 | Fowler et al. |
| 7,434,636 B2 | 10/2008 | Sutherland |
| 7,445,064 B2 | 11/2008 | Kim |
| 7,469,760 B2 | 12/2008 | Kamen et al. |
| 7,521,814 B2 | 4/2009 | Nasr |
| 7,554,291 B2 | 6/2009 | Yoshida |
| 7,597,388 B1 | 10/2009 | Samuel |
| 7,633,284 B2 | 12/2009 | Ingram et al. |
| 7,647,994 B1 | 1/2010 | Belloso |
| 7,673,713 B2 | 3/2010 | Betz et al. |
| 7,772,852 B2 | 8/2010 | Fechalos et al. |
| 7,884,569 B2 | 2/2011 | Ward |
| 7,910,250 B2 | 3/2011 | Hsu |
| 7,911,188 B2 * | 3/2011 | Wada et al. ................. 322/44 |
| 7,950,481 B2 | 5/2011 | Betz et al. |
| 8,004,219 B2 | 8/2011 | Mattson |
| 8,011,461 B2 | 9/2011 | Rodriguez et al. |
| 2001/0019256 A1 | 9/2001 | Olsson et al. |
| 2002/0153178 A1 | 10/2002 | Limonius |
| 2006/0030450 A1 | 2/2006 | Kyle |
| 2006/0152189 A1 | 7/2006 | Ambrosio et al. |
| 2006/0232238 A1 | 10/2006 | Horii |
| 2006/0237246 A1 | 10/2006 | Severinsky et al. |
| 2008/0094013 A1 * | 4/2008 | Su ............................. 318/139 |
| 2008/0248918 A1 | 10/2008 | Sastry et al. |
| 2009/0103341 A1 | 4/2009 | Lee et al. |
| 2009/0160247 A1 | 6/2009 | Nakamura et al. |
| 2010/0044129 A1 | 2/2010 | Kyle |
| 2010/0084207 A1 | 4/2010 | Wyall |
| 2010/0087974 A1 * | 4/2010 | Nakajima et al. ............ 701/22 |
| 2012/0274145 A1 * | 11/2012 | Taddeo ....................... 307/82 |
| 2013/0127419 A1 * | 5/2013 | Peter et al. ................ 320/119 |

FOREIGN PATENT DOCUMENTS

| | | |
|---|---|---|
| JP | 2002124302 | 4/2002 |
| JP | 2003092804 | 3/2003 |
| JP | 2010143310 | 7/2010 |
| WO | 2011/056998 A3 | 5/2011 |

OTHER PUBLICATIONS

PCT/US2012/044091 International Search Report and Written Opinion, Dec. 28, 2012.

PCT/US2012/044093 International Search Report and Written Opinion, Jan. 7, 2013.

* cited by examiner

ELECTRIC VEHICLE

CROSS-REFERENCES TO RELATED APPLICATIONS

This application claims the benefit of U.S. Provisional Patent Application No. 61/500,744 entitled "Electric Vehicle with Onboard Generation," which was filed on Jun. 24, 2011 for Lawrence Sadler. This application is filed on the same day as a related application by the same inventor entitled Power Conditioning System with serial number (to be inserted later), which is hereby incorporated by reference into this document.

FIELD

This invention relates to electric vehicles and more particularly relates to charging and discharging configurations of electrical energy storage devices in electric vehicles.

BACKGROUND

Automobiles have been the major mode of transportation for many decades. From early steam powered engines to the predecessors of modern day internal combustion engines, the energy released through combustion reactions has propelled the automobile, both literally and figuratively, across miles of highways and through years of calibrations, modifications, and improvements. Since the early days of automobiles there have been many great and important developments in engine performance, power, and efficiency. The latter of these listed developments, increasing engine efficiency, is perhaps the most important challenge facing car-makers today because of the limited amount of available combustible materials (i.e. hydrocarbon fuels). Therefore, car-makers have been continuously striving to increase engine efficiency by decreasing hydrocarbon fuel consumption.

Car-makers have generally approached this challenge in one of three ways: (1) developing internal combustion engines with higher gas mileage ratings, (2) developing electric cars to remove the automobile's dependence on hydrocarbon fuels to a remote location (i.e. coal power plant), and (3) developing hybrid automobiles that take advantage of both combustion propelled and electrically driven motors. While each of these approaches has advantages and disadvantages when compared to the others, the common underlying challenge in all three of these approaches is making an efficient automobile that can still provide enough power to match the power demanded, both in quantity and quality, during high-power driving situations (e.g. accelerating, climbing a hill, towing).

Automobiles with "high" gas mileage engines are very effective at operating efficiently by using relatively low quantities of fuel. However, not only are these "high" gas mileage engines still relatively inefficient at consuming hydrocarbon fuels (maybe up to 40 miles/gallon), these engines are also generally smaller and less powerful and are not well-suited for providing sufficient power to meet the constantly varying demands that are placed on a conventional automobile engine. For example, when a driver presses the accelerator pedal, the driver expects (demands) the engine to accelerate the vehicle to a faster speed, drive the vehicle up a hill, tow a load, carry a load, or otherwise propel the vehicle with substantial force. Conventional high gas mileage engines generally struggle to meet these demands and, if they are able to meet them, sacrifice efficiency to do so. These engines are not able to efficiently match the power supply with the power demand.

Conventional electric vehicles often include a bank of rechargeable batteries that propel the vehicle. While electric vehicles may be effective at supplying the motor with enough electricity to propel the vehicle through various power demand situations, the limited driving range and the long recharge time of the batteries are substantial drawbacks that limit the legitimacy of the electric vehicle as a practical solution to the current problem.

Hybrid vehicles use both internal combustion engines and electric batteries in various configurations to propel a vehicle. For example conventional hybrid vehicles may employ a configuration where the internal combustion engine supplements the electric propulsion during high-power driving situations. In another configuration, the internal combustion engine may recharge the batteries so that the batteries can meet the varying demands encountered during driving. However, the issue still remains that, regardless of whether the electric motor manages the high demand situations while the internal combustion engine manages the low demand situations or vice-versa, the engine will still need to have the capacity to generate the power needed (either horsepower or electric power) to handle the high demand situations.

SUMMARY

From the foregoing discussion, it should be apparent that a need exists for a system that is capable of conditioning the power generated onboard a vehicle to efficiently meet the vehicle's varying power demands, both in quantity and quality. Beneficially, such a system involves successively and individually charging a plurality of interconnected electrical energy storage devices ("EESDs") from which the motor can draw the demanded power.

The subject matter of the present application has been developed in response to the present state of the art, and in particular, in response to the problems and needs in the art that have not yet been fully solved by currently available power systems. Accordingly, the present disclosure has been developed to provide a system for conditioning the power generated onboard a vehicle to efficiently meet the vehicle's varying power demands, both in quantity and quality, which overcomes many or all of the above-discussed shortcomings in the art.

The present disclosure relates to an electric vehicle that includes a hydrocarbon engine coupled with a generator, the generator comprising a positive source connection and a neutral source connection. The electric vehicle further includes a plurality of interconnected electrical energy storage devices, each electrical energy storage device comprising a positive terminal and a neutral terminal. The electric vehicle also includes a switching subsystem configured to successively electrically connect each electrical energy storage device to the generator for a selected time interval in a repeating cycle by electrically connecting the positive source connection of the generator to the positive terminal of an electrical energy storage device and electrically connecting the neutral source connection of the generator to the neutral terminal of the electrical energy storage device. The electric vehicle also includes a motor for propelling the vehicle, the motor connected to and drawing power from the plurality of interconnected electrical energy storage devices.

The motor of the electric vehicle may be solely connected to the plurality of interconnected electrical energy storage devices. The generator of the electric vehicle may be an alternating current generator that includes a rectifier for converting the alternating current waveform into a direct current waveform. The electrical energy storage devices may be connected in series or in parallel or in a combination of both series and parallel.

The switching subsystem of the electric vehicle may include a processor and electronic switching devices for selectively opening and closing the switching devices. The switching devices may be electromechanical relays. The number of electrical energy storage devices may be three (3) and the time interval that each electrical energy storage device is charged for may range from about 0.0001 seconds up to 1.0 second. The power delivered from the electrical energy storage devices may be controlled using a device such as a potentiometer. The hydrocarbon engine and the generator may include load-sensing devices for automatically adjusting the power generation according to the sensed-load.

The electrical energy storage devices may be electrochemical batteries such as lithium-ion batteries or lead/acid batteries. The electrical energy storage devices may also be capacitors. Each electrical energy storage devices may be an individual battery cell or an individual capacitor or each electrical energy storage device may be a pack of batteries or capacitors. For example, three battery cells interconnected in series may make up a single electrical energy storage device.

The electric vehicle may also include auxiliary power sources that may supplement the motor or that may power secondary systems, such as air-conditioning and entertainment packages. The electrical energy storage devices may also be maintained at a certain charge level. For example, the charge level of each electrical energy storage device may need to remain above 75% or above 90%. The generator may be a three-phase alternating current generator that has a delta configuration. The neutral source connection of the generator or the rectifier may not connect to the chassis ground. The generator may charge one electrical energy storage device at a time but all of the electrical energy storage devices may discharge simultaneously.

In some implementations, the power generated by the engine coupled with the generator is less than the maximum power output of the interconnected electrical energy storage devices. Also, a first voltage and a first current may leave the generator to charge the electrical energy storage devices and a second voltage and a second current may leave the electrical energy storage devices to power the motor, where the first voltage is different than the second voltage and the first current is different than the second current.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
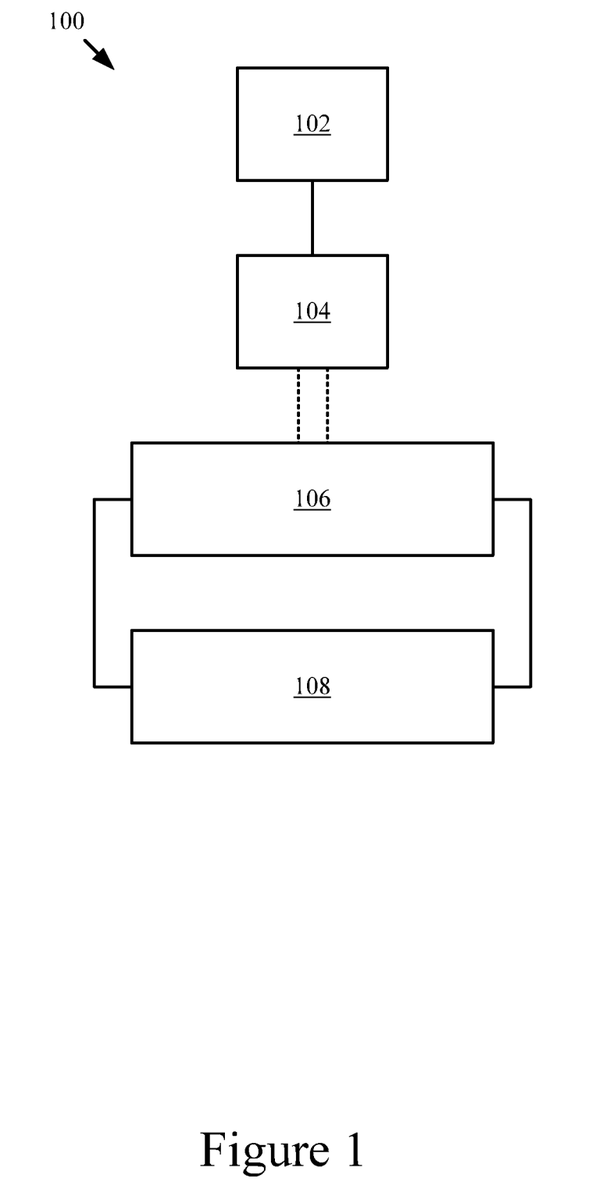
FIG. 1 is a schematic block diagram of one embodiment of an electric power system in a vehicle that includes an electrical energy source, a switching subsystem, a plurality of interconnected electrical energy storage devices, and a load on the system.

FIG. 1 is a schematic block diagram of one embodiment of an electric power system 100 for propelling a vehicle. The system 100, in one embodiment, includes an electrical energy source 102, a switching subsystem 104, a plurality of interconnected electrical energy storage devices ("EESDs") 106, and a load 108. The electrical energy source 102, which is described below with reference to FIG. 2, generally produces or generates electricity and may include various conditioning components. The switching subsystem 104, which is described below with reference to FIG. 3, generally cycles through the individual EESDs 106 and successively charges each one. The switching subsystem 104 may include, in one embodiment, multiple mechanical switches or relays and a processor control unit. The plurality of interconnected EESDs 106, which is described below with reference to FIG. 4, stores electricity produced by the electrical energy source 102 and provides power to the load 108.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

FIGS. 2A-2D are schematic block diagrams of various embodiments of an electrical energy source 102. The electrical energy source 102 may be any voltage or current source and it may be selected according to the requirements of a particular application. The electrical energy source 102 may produce electricity in either alternating current ("AC") or direct current ("DC") waveforms. According to the requirements of a given application, the electrical energy source 102 may further include suitable electricity conditioning component(s), such as a rectifier(s) or inverter(s) for converting the electricity into a desired waveform. The rectifier(s) or inverter(s) may be sized to meet the current and voltage parameters of a given application.

The subject matter of the present disclosure, in one embodiment, relates to a new electric vehicle constructed specifically to operate based on the power system described herein. In another embodiment, the subject matter of the present disclosure relates to a conventional vehicle that may be retro-fitted with the power system described herein. Additionally, the term "vehicle," although generally applied to cars with four wheels, is defined herein as any self-propelled carriage for transporting goods or people, which includes by way of example, cars, boats, ships, motorcycles, electric bicycles, trains, airplanes, and the like.

Figure 2A:
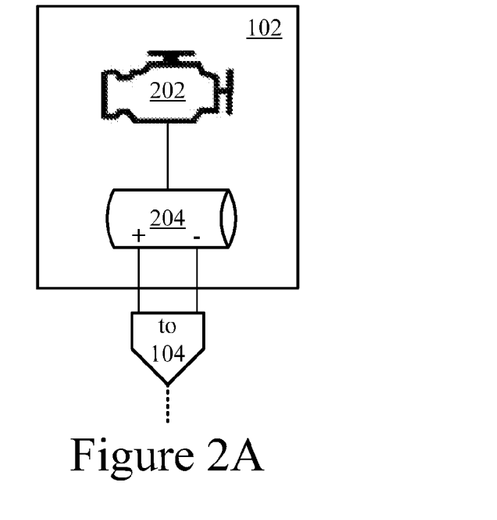
FIG. 2A-2D are schematic block diagrams of embodiments of an electrical energy source that may include a hydrocarbon engine, a generator, a rectifier, and an auxiliary power source.

FIG. 2A is a schematic block diagram of one embodiment of an electrical energy source 102, which includes a hydrocarbon engine 202 and a DC generator 204. The engine 202 may be powered by a hydrocarbon fuel such as gasoline, diesel fuel, natural gas, or hydrogen, among others. In one embodiment, the engine 202 is substantially separate from the generator 204 and the engine 202 provides the torque necessary to rotate the generator 204 rotor. For example, the engine 202 may be a conventional automobile engine, such as a 4 cylinder gasoline engine, and the generator 204 may be a separate component that is coupled with the automobile engine 202. In another embodiment, the engine 202 and the generator 204 may be substantially the same component (i.e. stand-alone portable backup generator) and the generator 204 may include a reaction chamber for combusting a hydrocarbon fuel, which would power the rotational motion of the generator rotor. The electrical energy source 102 may also include multiple engines 202 and/or multiple generators 204, as determined by the specifics of a given application.

In one embodiment, the engine 202 may operate at a substantially fixed RPM. The fixed RPM may be the optimal operating condition of the engine 202 for maximizing efficient power generation or it may be the operating condition required to meet the predicted and long term load 108 on the system 100. Using the above example of the 13 horsepower Dura Max engine, if the load on the system is predicted to be about 80-100 amps, the engine 202 may operate at approximately 1000 to 3500 RPM to meet the demand. In another embodiment, the engine 202 may be configured, via the governor or some other controlling mechanism, to operate at a sufficient rate to substantially meet the load 108 on the system 100. For example, if for a period of time the draw/demand on the EESDs 106 is greater than the power generated by the electrical energy source 102, an automatic load sensing governor may cause the engine 202 and the generator 204 to increase electricity output to match the demand.

In another embodiment, a user may control power generated by the electrical energy source 102. For example, a user may set the engine/generator 202/204 to a certain operating set point according to the anticipated demand placed on the system. The user may also, in one embodiment, continuously adjust the operating level of the engine/generator 202/204 according to the instantaneous demand placed on the system by configuring the accelerator pedal of the vehicle to control the operating rate of the engine/generator 202/204.

As depicted in FIG. 2A, the generator may be a direct current generator 204. In one embodiment, the direct current generator 204 may include both a positive source connection and a neutral source connection and both source connections may be electrically connected to the switching subsystem 104 (see FIG. 3). The direct current generator 204 may also include conditioning components that smooth the resulting waveform.

Figure 2B:
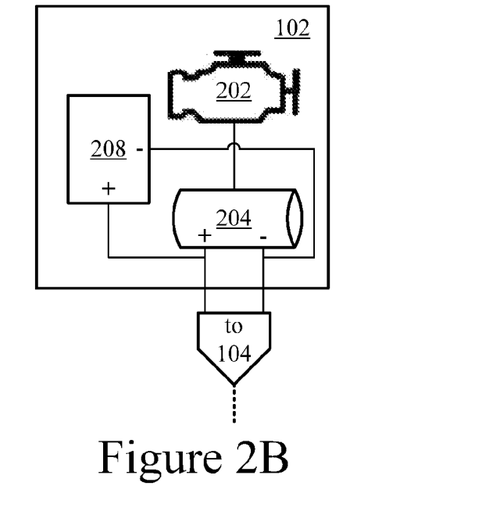

FIG. 2B is a schematic block diagram of another embodiment of an electrical energy source 102, which includes a hydrocarbon engine 202, a DC generator 204, and a direct current auxiliary power source 208. The auxiliary power source 208 may include photovoltaic cells, regenerative braking generators, vehicle-mounted wind turbine generators, secondary generators, and the like. The auxiliary power source 208 may constantly supplement the power provided by the generator 204 or the auxiliary power source 208 may intermittently supplement the power generated by the generator 204. The auxiliary power source 208 may be configured to produce electricity only when certain conditions are met, for example when braking (regenerative braking) or when traveling above certain speeds (vehicle-mounted wind turbine generators). The auxiliary power source 208 may only generate electricity when certain systems in the vehicle are activated, such as when an air-conditioner unit is running or when secondary electronics are turned on such as entertainment systems (audio/visual players), navigation screens, automatic seat positioning, etc. In some embodiments (not depicted), the auxiliary power source 208 may be directly connected to the electric motor 108 for supplementing the propulsion of the vehicle.

Figure 2C:
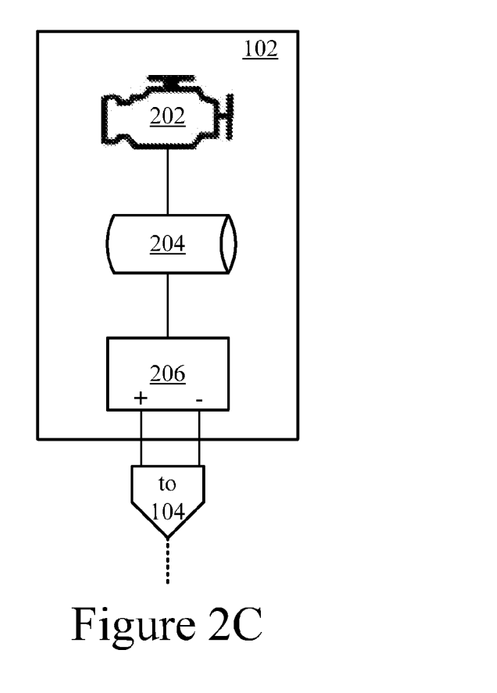

FIG. 2C is a schematic block diagram of a further embodiment of an electrical energy source 102, which includes a hydrocarbon engine 202, an AC generator 204, and a rectifier 206. The AC generator 204 may be electrically connected with a rectifier 206 for converting the AC waveform into a substantially DC waveform. The rectifier 206, in one embodiment, includes both a positive source connection and a neutral source connection and both source connections may be electrically connected to the switching subsystem 104 (see FIG. 3).

The rectifier 206 may be a vacuum tube diode rectifier, a mercury-arc valve rectifier, solid-state diode rectifier, or a silicon-controlled rectifier, among others. The rectifier 206 may include a single rectifying component or may include multiple rectifying components. In one embodiment, the rectifier 206 includes 200 amp bridge diode rectifiers ("Quicktifier" 210 as made by Quick Start Automotive Electric of Comstock Park, Mich.) capable of transforming three-phase AC power into a substantially DC current. Further filters or conditioning components 206 may optionally be used to smooth and otherwise condition the resulting waveform. It is contemplated that such other waveform conditioning components 206 and their equivalents, as recognized by those of ordinary skill in the art, would fall within the scope of the present disclosure.

By way of specific examples, the hydrocarbon engine 202 may be a thirteen to sixteen horsepower gas Duro-Max engine with a built in governor, model number DS 13-DS16 made by Chongong-Sanding Company of China, connected to a Mars 40 volt, 150 amp, three-phase AC generator head made by Mars Corporation of Milwaukie, Wis., and may be connected to a 200 amp bridge diode rectifier. In another example, the hydrocarbon engine 202 is an L2 Mitsubishi Diesel, 12.9 hp, 2 cylinder engine, connected to a brushless type generator that outputs three-phase AC at 40 Amps, such as the Mars generator listed above.

Figure 2D:
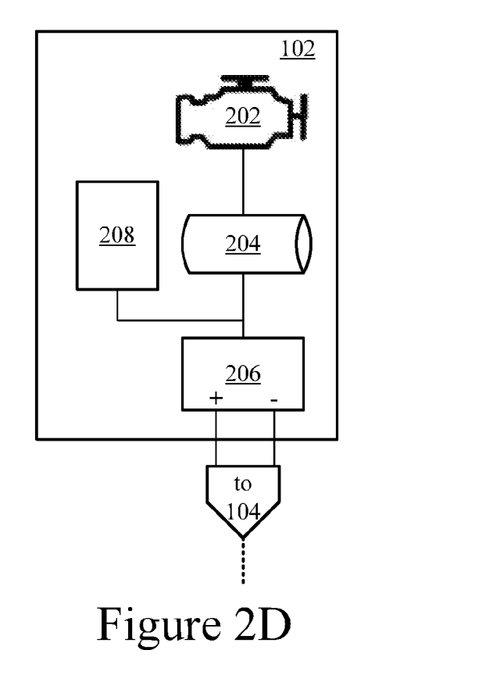

FIG. 2D is a schematic block diagram of yet another embodiment of an electrical energy source 102, which includes a hydrocarbon engine 202, an AC generator 204, a rectifier 206, and an alternating current auxiliary power source 208. The auxiliary power source 208 of FIG. 2D may be substantially the same as the auxiliary power source described above with reference to FIG. 2B. The auxiliary power source 208 may include various types of electricity generators and may be configured to supplement the power generated by the generator 204. It is contemplated that one of ordinary level of skill in the art will recognize other auxiliary power sources 208 that fall within the scope of this disclosure.

Figure 3:
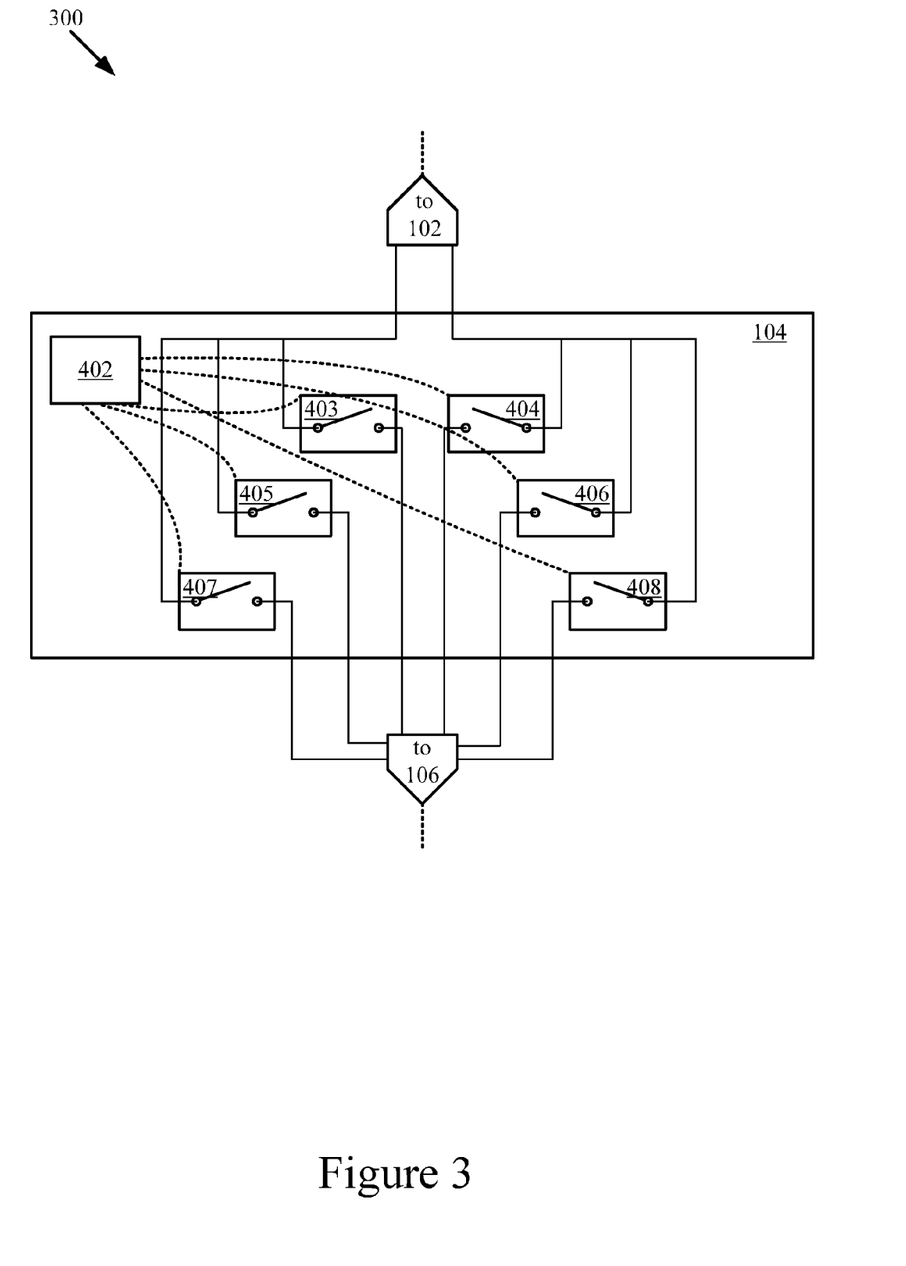
FIG. 3 is a schematic block diagram of one embodiment of a switching subsystem that includes a configuration of mechanical contactor switches and a processor.
Figure 4:
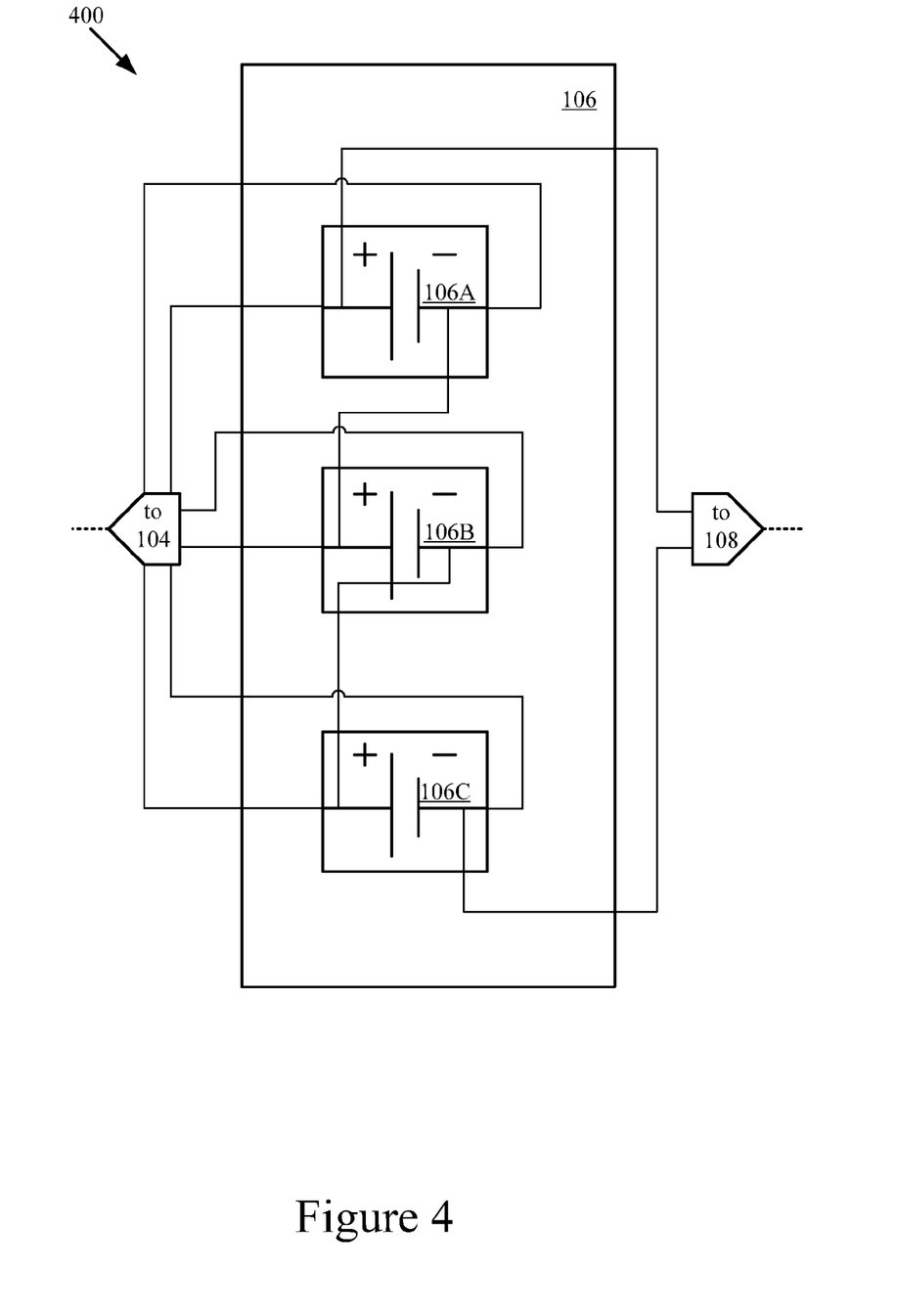
FIG. 4 is a schematic block diagram of one embodiment of a plurality of interconnected electrical energy storage devices.

FIG. 3 is a schematic block diagram of one embodiment 300 of a switching subsystem 104, which includes a processor 402 and a configuration of switches 403-408. The switching subsystem 104 enables the efficient charging of the EESDs by successively individually connecting each EESD 106 to the power source 102 for a certain time interval before moving on to the next-in-line EESD 106. Generally, the number of switches is twice the number of EESDs 106. For example, in one embodiment there are four interconnected EESDs 106.

Each of these EESDs 106 (as described below in greater detail with reference to FIG. 4) includes a positive terminal and a neutral terminal. Correspondingly, each positive terminal of an EESD 106 is electrically connected to a positive switch that is electrically connected to the positive source connection of the generator 204 or rectifier 206, and each neutral terminal of an EESD 106 is electrically connected to a negative/neutral switch that is electrically connected to the neutral source connection of the generator 204 or rectifier 206. Thus, in one embodiment the, neutral source connection of the generator 204 or rectifier 206 is not directly connected to the vehicle ground and is only connected to the switching subsystem 104. Such a configuration 104 charges the EESDs 106 efficiently with a smaller, more energy efficient energy source while the EESDs 106 are still able to meet the instantaneous energy requirements of the load 108.

This switching subsystem 104 effectively restricts the apparent load on the electrical energy source 102 to a single EESD 106. In other words, the electrical energy source 102 only "sees" one EESD 106 at a time during charging and therefore the electrical energy source 102 can be configured to generate electricity at an optimal efficiency because the apparent load (a single EESD) is less than if the entire group of EESDs were charged at once. Thus, in one embodiment, the electrical energy source 102 charges the plurality of EESDs 106 at a substantially constant rate while the interconnected EESDs 106 discharge according to the demands of the load 108 on the system 100. In this manner, the EESDs 106 are able to discharge properly conditioned electricity, both in quantity (power) and quality (proper voltage/current) according to the fluctuating demand placed on the motor 108.

The switching subsystem 104 enables each EESD 106 to be charged up to the voltage of the electrical energy source 102. Therefore, upon discharge, the voltages of the EESDs 106, depending on their interconnected configuration, may sum to a voltage greater than that of the source 102 voltage. In one embodiment, the power conditioning system 100 is capable of providing a higher voltage and/or a higher current than that of the electrical energy source 102, at least for a certain period of time.

Even in applications where the electricity produced by the electrical energy source 102 fluctuates and is beyond the control of a user, such as in non-dispatchable energy generation (ie wind turbines, photo-voltaic cells), the plurality of EESDs 106 may still be charged by the varying electrical energy sources by connecting the varying source 102 to the switches of the switching subsystem 104. In this manner, the EESDs 106 are able to absorb most fluctuations in the amount of energy produced by the source 102 and are able to deliver electricity conditioned to meet the system's demand. Thus, regardless of whether the electric supply is fluctuating or the electric demand is fluctuating, a power system according to the present disclosure can be used to effectively and efficiently match (both quality and quantity) the supply with the demand.

In another embodiment, the switching subsystem 104 involves charging more than one EESD 106 at a time. For example, in an application with four interconnected EESDs, switches may be configured to charge two (2) EESDs at the same time for a certain time interval and then subsequently charge the other two (2) EESDs. The time intervals for relay charging the interconnected EESDs can vary depending on the specifics of a given application (i.e. characteristics of the electrical energy source, capacity of EESDs, type of EESDs, number of EESDs, requirements of the load, etc.). In one embodiment, the time interval for charging each EESD is in the range of between about 0.0001 seconds and 1 second. In another embodiment, the time interval for charging each EESD is in the range of between about 0.001 seconds and 0.5 seconds. In yet another embodiment, the time interval for charging each EESD is about 0.003 seconds. The charging sequence time intervals in one embodiment can be changed while the vehicle is in operation according to the sensed charge levels of the various EESDs 106.

In a further embodiment, the EESDs are charged individually, one at a time, or a group at a time. Additionally, the EESDs may be charged according to need. That is, the EESDs may be charged according to rate of depletion of charge if certain EESDs are depleting their charge at a rate that is faster than the other EESDs. Sensors on the EESDs may be queried to determine which are most in need of charge.

In the depicted embodiment 300, the processor 402 controls the opening and closing of the switches 403-408. The processor 402 may be a stand-alone processor that controls the switches 403-408 or the processor 402 may be a component of a vehicle control system. For example, a conventional vehicle may include a governor or a controller that regulates the power system in the vehicle and the processor 402, in one embodiment, may be a module or a component of the existing controller system.

The switches 403-408 may, in one embodiment, be electro-mechanical switches that either physically close or physically open a circuit. The mechanical switches may be single pole on/off switches, multiple-pole switches, electro-mechanical contactor switches, electrical actuators, or relay switches, among others. The electro-mechanical switches have been shown to provide a better isolation in testing by the inventor.

In another embodiment, the switches 403-408 may be solid-state relays. Solid-state relays may be able to switch faster than mechanical switches; therefore, in some implementations where fast switching is required, it may be advantageous to use solid-state relays. Power transistors or other solid state switching devices may also be used.

The switching subsystem 104 in one embodiment includes neutral switches that are electrically isolated from the system ground. The neutral switches electrically connect the neutral source connection of the generator 204 to the neutral terminal (see FIG. 5) of the EESDs 106 that are being charged. One closed neutral switch and one closed positive switch effectively complete a charging circuit charging an individual EESD 106 for a selected time interval while the other switches are open and effectively isolate the other EESDs from the charging circuit. However, in one embodiment, none of the switches affect the connecting or isolating of the discharge circuit. In other words, in this embodiment, the EESDs 106 successively individually receive charge from the electrical energy source 102 one at a time in a repeating cycle while simultaneously discharging power to the load 108.

FIG. 4 is a schematic block diagram of one embodiment 400 of a plurality of interconnected EESDs 106. An EESD 106 may be any device, mechanism, system, machine, apparatus, battery, etc. that can hold a charge for a period of time and can be charged and discharged multiple times (i.e. rechargeable). Each EESD 106 includes a positive terminal and a neutral terminal (denoted in FIG. 4). These terminals are each electrically connected to a switch 403-408 which is electrically connected to an source connection on the generator 204.

In one embodiment, the plurality of EESDs 106 includes multiple electro-chemical battery packs and each battery pack includes multiple individual battery cells; for example, rechargeable lithium ion batteries, nickel-metal hydride batteries, and nickel-cadmium batteries, among others, may constitute the plurality of EESDs 106. In another embodiment, the EESDs 106 used in the system 100 are lead-acid type batteries as are used in conventional automobiles. Since electro-chemical batteries operate by using oxidation and reduction reactions, the rate of charge/discharge may be too slow for some applications. Therefore, in some applications, other types of EESDs 106, such as capacitors or hybrid battery/capacitors may be used in the system 100.

Because capacitors store energy in an electric field, capacitors generally are capable of charging more rapidly than electro-chemical batteries and therefore may be better suited for certain implementations when quickly charging the EESDs 106 is important. In one embodiment, a capacitor may be charged to capacity in less than five seconds. Capacitors are generally comprised of two plates, one positively charged and the other negatively charged, and separated by a thin insulating material known as a dielectric. In one embodiment, 500 Farad "Super Capacitors", manufactured by Xstatic of Newton, Ala., may be used as EESDs 106.

Other types of batteries may also function as EESDs. For example, hybrid batteries, which include both electro-chemical energy storage and electric field energy storage (capacitors), may be used to improve energy storage, decrease battery leakage, increase lifetime cycles, decrease charge time, and/or otherwise facilitate using the power conditioning system. Hybrid battery-capacitors, such as "Batcaps" available from Xstatic Corporation of Newton Ala., may be used in the present disclosure.

In yet another embodiment, the EESDs may include magnetic field storage devices such as inductors. The flow of electric charges through a conductor induces a magnetic field that can store energy. Inductors are especially useful when working with AC current because they are able to delay and reshape the AC waveform as current and voltage change over time.

Although using the same type of EESD 106 throughout the system appears to work best (a preferential embodiment), it is contemplated that multiple types of EESDs 106 may be utilized in the same system to effectively manage the varying supply and/or demand on the system 100. For example, in some applications one of the EESDs 106 may experience higher or lower temperatures due to the configuration of the system and the rate of charge or discharge. In such situations, it may be desirable to use different types of EESDs 106, such as two capacitors and one electro-chemical battery, in order to effectively and efficiently manage the electricity supply and/or demand in a system.

The number of EESDs 106 in the system 100 may be selected according to the specifics of a given application. For example, a system with comparatively more EESDs 106 will be better equipped to manage large voltage fluctuations than a system with comparatively fewer EESDs 106. In one embodiment, the number of EESDs 106 is in the range of between about 2 and 100. In another embodiment, the number of EESDs is in the range of between 3 and 20. In yet another embodiment, the number of EESDs is 3 or 4.

Each EESD 106 may be a battery or capacitor pack that includes multiple battery cells or individual capacitors connected in series. For example, three battery packs 106 may constitute the plurality of EESDs 106 and each battery pack may include three individual battery cells connected in series. The voltage and amp-hour ratings of the batteries or the capacitance of the capacitors may be selected according to the specifics of a given application. In one embodiment, the battery cells may be 12.5 volt, 85 amp-hour batteries connected in series, thus each battery pack has a voltage rating of 36-40 volts.

Also, the EESDs 106 may be interchangeably connected in order to provide various discharge scenarios. For example, if four EESDs 106 are connected in series and each one has been charged to 12 volts/40 amps, upon discharge the individual EESDs 106 will sum to give a useable current of 48 volts and 40 amps. In another example, the same four charged EESDs 106 may be connected in two parallel series configurations. In other words, two EESDs 106 discharging in series (24 volts/40 amps) and another two EESDs 106 discharging in series (24 volts/40 amps) would result in a useable current of 24 volts and 80 amps.

In one embodiment, according to the amount of power demanded 108, the type and capacity of the EESDs 106, the switching frequency of the switching subsystem 104, and the size and capacity of the engine 102 the charge level of the plurality of EESDs 106 may need to remain above a certain percentage. For example, in one embodiment, three electro-chemical battery packs interconnected in series may need to remain at least 90% charged during the majority of operation of the vehicle in order to effectively and efficiently sustain the vehicle's propulsion. In another embodiment, the interconnected EESDs 106 may need to remain at least 75% charged in order to effectively and efficiently sustain the vehicle's propulsion. In another embodiment, the, the interconnected EESDs 106 may need to remain at least 50% charged in order to effectively and efficiently sustain the vehicle's propulsion. The EESDs 106 may be held above the selected charge level for the majority of operation and in one embodiment are maintained above the selected charge level for substantially the entire duration of operation. In yet another embodiment, the EESDs 106 may be able to drop to nearly a 0% charge and still the electrical energy source 102 may be able to recover the charge while the vehicle is on the move.

In some embodiments, a user may have to slow or stop the propulsion of the vehicle in order to allow the EESDs to recharge to a sufficient level before proceeding with travel. The output of the system may automatically be reduced as the charge level of the EESDs drops below the optimal charge level.

In one embodiment, the engine 202, generator 204, and switching subsystem may continue to charge the EESDs 106 after the vehicle has finished traveling and has been parked and turned "off." This may be an automatic feature requiring no user input to maintain or initiate charging, and may also automatically switch the engine 202 off once the EESDs 106 have reached a selected level of charge.

Figure 5:
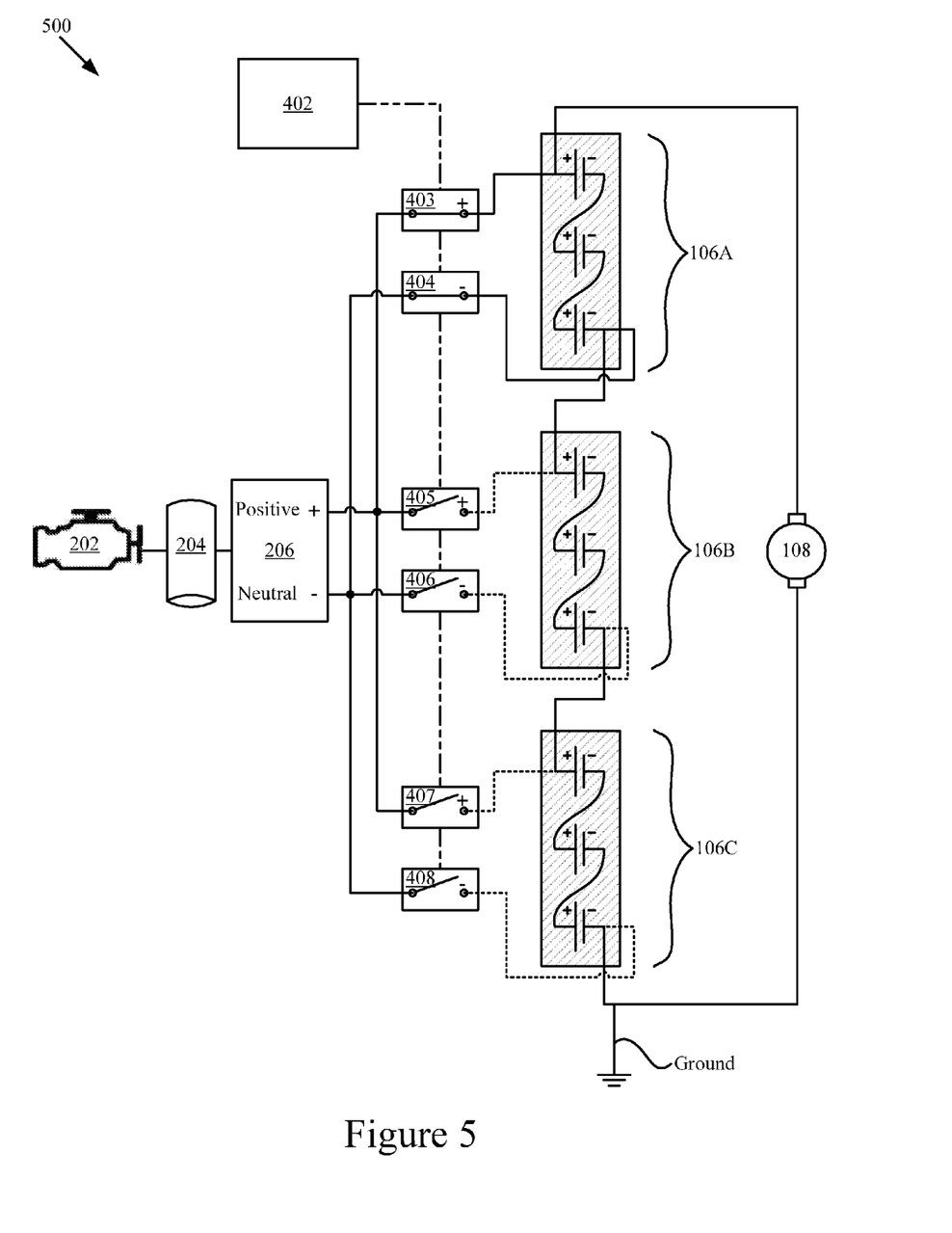
FIG. 5 is a schematic block diagram of a further embodiment of an electric power system in a vehicle that includes an electrical energy source, a switching subsystem, a plurality of interconnected electrical energy storage devices, and a load on the system.

FIG. 5 is a schematic block diagram of another embodiment of an electric power system 500 in a vehicle, which includes an electrical energy source 102, a switching subsystem 104, a plurality of EESDs 106, and a load 108. The electrical energy source 102 includes a hydrocarbon engine 202, an AC generator 204, and a rectifier 206. The rectifier 206, after converting the AC waveform in a DC waveform, includes a positive source connection and a neutral source connection.

The switching subsystem 104 includes a processor 402 and six switches 403-408, three positive switches and three negative/neutral switches. The plurality of EESDs 106 includes three battery packs 106A, 106B, 106C, each of which includes three battery cells connected in series. Each battery pack 106A, 106B, 106C includes a positive terminal and a neutral terminal and these terminals are electrically connected to their respective switches. In the depicted embodiment, the three battery packs 106A, 106B, 106C are interconnected in series and discharge to power the load 108.

In the depicted embodiment, the load 108 is an electric motor for propelling the vehicle. The motor may be selected according to the specifics of a given application. For example, if a vehicle that weighs comparatively more than a lighter vehicle, the vehicle that weighs more will require a more powerful motor 108. The more powerful the motor 108, the more electricity it will demand, which will in turn affect the size and capacity of the plurality of EESDs 106 and the size and capacity of the electrical energy source 102. The motor 108, in one embodiment, also includes a controller device for controlling the power drawn from the EESDs 106. The controller device may be a potentiometer or current-pulser that governs the amount of electricity that powers the motor 108, which affects the speed and acceleration of the vehicle.

In one embodiment, the controller device is configured with the accelerator pedal of the vehicle so that when a user/driver presses down on the pedal, the controller demands more power from the EESDs 106 in order to propel the vehicle. In one embodiment, the user input (accelerator pedal) only controls the draw on the EESDs and does not directly control the RPMs of the engine 202. Thus, the RPM of the engine 202 in one embodiment is solely determined by the charge level of the EESDs 106 (see description of FIG. 2A for additional details). The controller device may be a stand-alone controller system which is entirely separate from the main governor/computer system of the vehicle. In another embodiment, however, the controller device may be a module or an element of the existing controller/computer system of the vehicle.

In the depicted embodiment of FIG. 5, the motor 108 draws electric power solely from the plurality of series connected EESD packs 106A, 106B, 106C. In another embodiment (not depicted), the motor 108 may draw electric power from other components, such as an auxiliary power source 208. In one embodiment, the motor 108 propels the vehicle a distance in the range of between about 50 miles to 200 miles for each gallon of fuel used in the engine 202. In another embodiment, the motor 108 propels the vehicle a distance in the range of between about 75 miles to 150 miles for each gallon of fuel used in the engine 202. In yet another embodiment, the motor 108 propels the vehicle a distance of about 100 miles for each gallon of fuel used in the engine.

Figure 6:
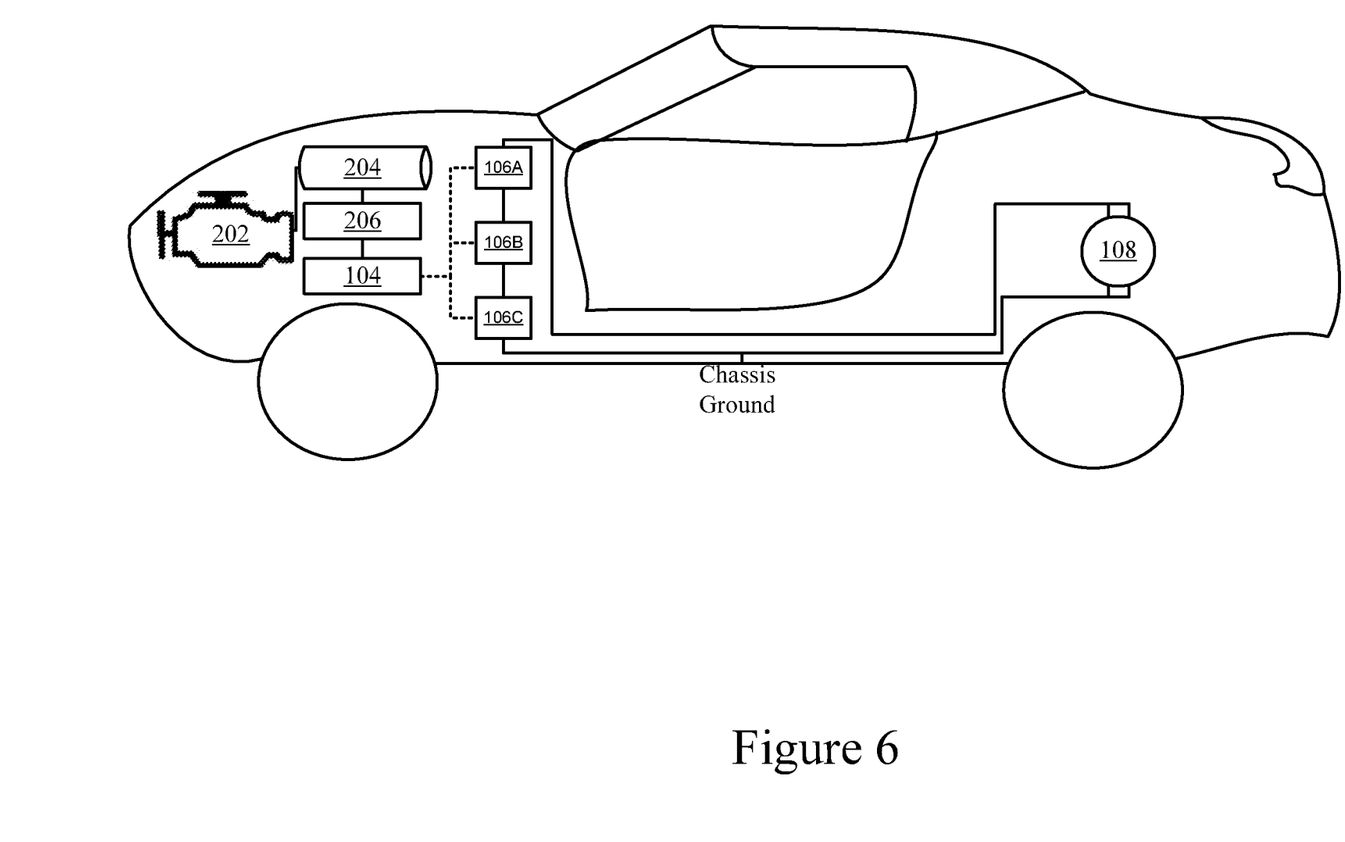
FIG. 6 depicts one embodiment of a layout of an electric power system within a vehicle.

FIG. 6 depicts one embodiment of a layout of an electric power system within a vehicle. Although not to scale, the relative positioning of the components of the power system represent, in one embodiment, how such a power system may be implemented in a vehicle. The hydrocarbon engine 202 is electrically connected to the generator 204 which is electrically connected to the rectifier 206. The rectifier 206 outputs the DC current to multiple switches (not depicted) which are then electrically connected to three EESDs 106A, 106B, 106C. The EESDs, which are interconnected in series, discharge to the electric motor 108 according to a driver's demand.

The power system in the electric vehicle of the present invention may be used in a stationary usage. One example of a stationary usage is in a power conditioning system as described in the copending patent application entitled Power Conditioning System by the same inventor that is being filed on the same day as this application. The electric vehicle system of the present invention may be utilized at any stage in the power generation system of that application. In one embodiment it is employed subsequent to the electrical energy source and prior to the EESDS. In another embodiment it is employed subsequent to the EESDs of that system and prior to the load. In a further embodiment, electric vehicle systems are located at both of the aforesaid locations. The electrical controllers of the two systems may be combined or may be separate.

The following example represents an electrical power system patterned according to the details and descriptions disclosed herein:

A 1996 Geo Tracker, weighing approximately 2400 lbs, was equipped with a power conditioning system, which included an engine, a generator, two bridge rectifiers, a microprocessor for controlling six contactor relays, three battery packs, an electric motor, and a power controller. The engine was an L2 Mitsubishi® Diesel, 12.9 hp, 2 cylinder. The generator was a brushless-type, three-phase generator, manufactured by Mars Electric (Willoughy, Ohio), that generated alternating current at about 40 volts and 150 amps and was capable of operating at greater than 90% efficiency. The generator was connected to two Quick Start Automotive Electric bridge rectifiers ("Quicktifiers"), each having a 200 amp capacity that converted the electricity generated by the generator from a three-phase alternating current waveform to a substantially single-phase direct current waveform. The positive terminal of the rectifiers was connected in parallel to three Curtis Albright SW180 single-pole on/off contactors and the neutral terminal of the rectifiers was connected in parallel to three more Curtis Albright SW180 single-pole on/off contactors.

Three battery backs were interconnected in series and each battery pack consisted of three 85 amp-hour, 12.5 volt, deep-cycle BlueTop® marine batteries manufactured by Optima®. The marine batteries were connected in series within each pack, therefore, each battery pack was capable of holding a 36-40 volt charge. A positive contactor was connected to each of the positive terminals of the three battery packs and a neutral contactor was connected to each of the three neutral terminals of the three battery packs. The six contactors were governed by a Zen processor made by Omron Corporation of Schaumburg, Ill., that controlled the closing and opening of the contactors and thereby controlled the time interval that each individual battery pack was to be charged in rapid switching succession. The time interval was set at 0.003 seconds.

The electric motor, which drew electricity directly from the series battery packs to propel the vehicle, was a 10 inch electric ME 10120011-CCW, 110 horsepower motor, rated at 120 volts distributed by Evnetics LLC of St. Petersburg Fla. The power controller was a Curtis 1221B controlled by a CurtisB60 potentiometer for motor control. Curtis Instruments has an office in Mt. Kisco N.Y. The motor controller was placed in electrical communication with the acceleration pedal in the vehicle to control the amount of power provided from the battery packs to the motor. This power system propelled the Geo Tracker at 75 miles per hour and the diesel engine only used about 1 gallon of diesel fuel per 80-100 miles.

Figure 7:
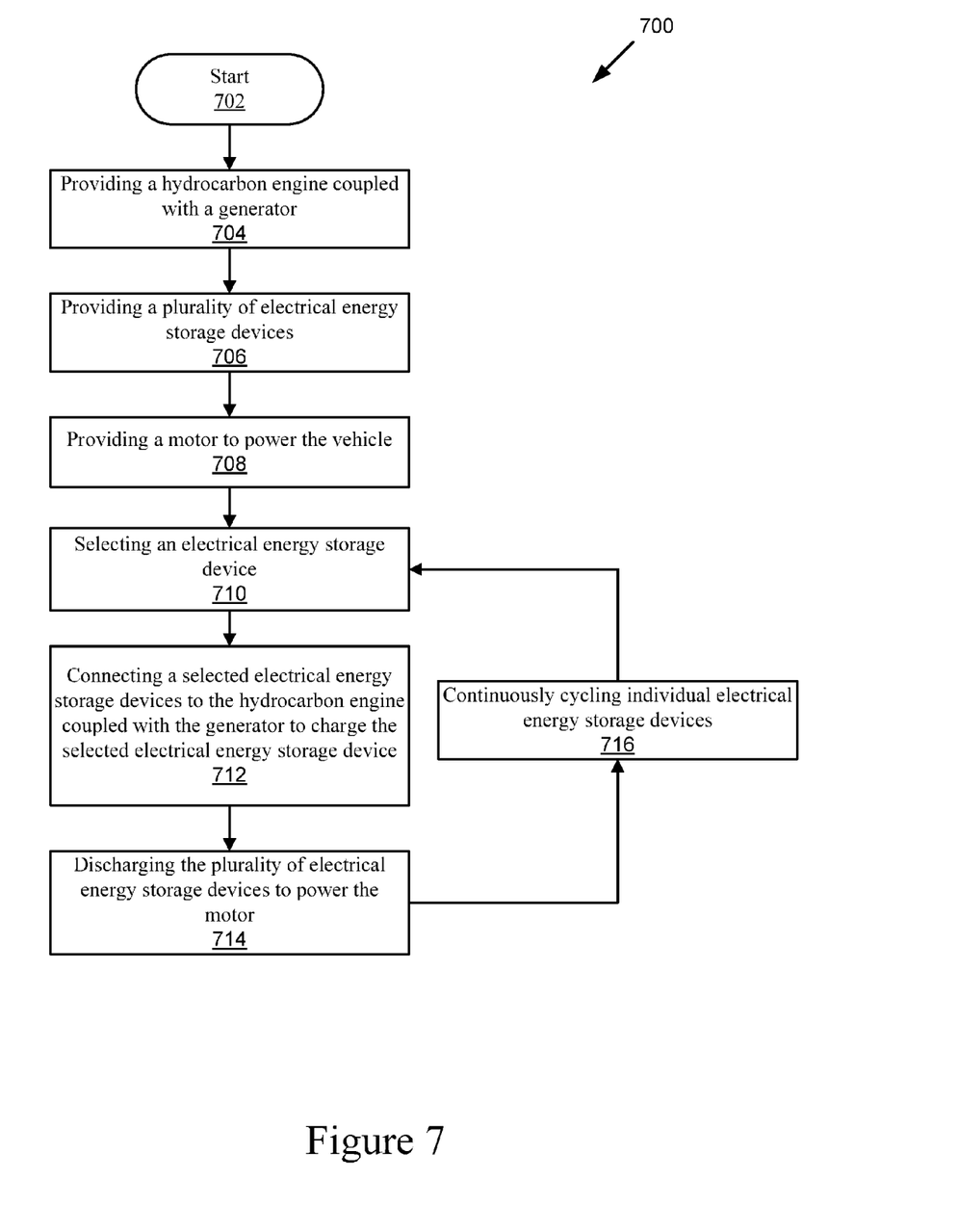
FIG. 7 is a flow chart diagram illustrating the operation of firmware in a microprocessor of the electric power system of the present invention.

FIG. 7 is a flow chart diagram illustrating the operation of firmware in a microprocessor of the electric power system of the present invention. The method begins 702 by providing 704 a hydrocarbon engine coupled to a generator, providing 706 a plurality of interconnected electrical energy storage devices, and providing 708 a motor to power the vehicle. Embodiments of these components are substantially described above.

After the above components have been provided, the method continues by selecting 710 an electrical energy storage device and connecting 712 the selected electrical energy storage devices to the hydrocarbon engine coupled with the generator to charge the selected electrical energy storage device. The method continues by discharging 714 the plurality of electrical energy storage devices to power the motor. The method continues to cycle 716 through electrical energy storage devices while the electric vehicle is in operation.

The described features, structures, or characteristics of the disclosure may be combined in any suitable manner in one or more embodiments. One skilled in the relevant art will recognize that the subject matter of the present application may be practiced without one or more of the specific details, or with other methods, components, materials, and so forth. In other instances, well-known structures, materials, or operations are not shown or described in detail to avoid obscuring aspects of the disclosure.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An electric vehicle comprising:
a hydrocarbon engine coupled with a generator, the generator comprising a positive source connection and a neutral source connection;
a plurality of interconnected electrical energy storage devices, each electrical energy storage device comprising a positive terminal and a neutral terminal;
a switching subsystem configured to successively electrically connect each electrical energy storage device to the generator for a selected time interval in a repeating cycle by electrically connecting the positive source connection of the generator to the positive terminal of an electrical energy storage device and electrically connecting the neutral source connection of the generator to the neutral terminal of the electrical energy storage device; and
a motor for propelling the vehicle, the motor connected to and drawing power from the plurality of interconnected electrical energy storage devices.

2. The vehicle of claim 1, wherein the motor is connected to and draws power solely from the plurality of interconnected electrical energy storage devices.

3. The vehicle of claim 1, wherein the generator is an alternating current generator comprising a rectifier for converting the alternating current waveform into a substantially direct current waveform, wherein the positive source connection and the neutral source connection are components of the rectifier.

4. The vehicle of claim 1, wherein the electrical energy storage devices are interconnected in series.

5. The vehicle of claim 1, wherein the electrical energy storage devices are interconnected in parallel.

6. The vehicle of claim 1, wherein the switching subsystem comprises a processor and electronic switching devices, wherein the processor controls the opening and closing of the electronic switching devices.

7. The vehicle of claim 6, wherein the electronic switching devices are electromechanical relays.

8. The vehicle of claim 1, wherein the number of electrical energy storage devices is three.

9. The vehicle of claim 1, wherein the time interval is in the range of between about 0.0001 seconds and 1.0 second.

10. The vehicle of claim 1, wherein the time interval is in the range of between about 0.001 seconds and 0.5 seconds.

11. The vehicle of claim 1, wherein the time interval is in about 0.003 seconds.

12. The vehicle of claim 1, further comprising a control device for a user to control the power delivered from the plurality of interconnected electrical energy storage devices to the motor.

13. The vehicle of claim 1, wherein the hydrocarbon engine coupled with the generator further comprises a load-sensing device for automatically adjusting the power generation according to the sensed-load.

14. The vehicle of claim 13, wherein the load-sensing device senses the charge level of the electrical energy storage devices.

15. The vehicle of claim 1, wherein the electrical energy storage devices comprise electro-chemical batteries.

16. The vehicle of claim 1, wherein the electrical energy storage devices comprise capacitors.

17. The vehicle of claim 1, wherein the electrical energy storage devices comprise electrical energy storage packs comprising multiple battery cells.

18. The vehicle of claim 17, wherein each electrical energy storage pack comprises three battery cells connected in series.

19. The vehicle of claim 1, further comprising an auxiliary power source electrically connected to the switching subsystem.

20. The vehicle of claim 1, wherein the neutral source connection of the generator is not directly connected to a system ground.

21. The vehicle of claim 1, wherein the electrical energy storage devices retain a charge level of at least about 75% during the majority of operation.

22. The vehicle of claim 1, wherein the electrical energy storage devices retain a charge of at least about 90% during the majority of operation.

23. The vehicle of claim 1, wherein the generator comprises a three-phase AC generator in a delta configuration, and wherein the generator is not connected to a chassis ground.

24. The vehicle of claim 1, wherein the interconnected electrical energy storage devices all discharge to the motor at the same time and only one of the electrical energy storage devices receives charge from the generator at the same time.

25. The vehicle of claim 1, wherein the power generated by the engine coupled with the generator is less than the maximum power output of the interconnected electrical energy storage devices.

26. The vehicle of claim 1, wherein a first voltage and a first current leave the generator to charge the electrical energy storage devices and a second voltage and a second current leave the electrical energy storage devices to power the motor, wherein the first voltage is different than the second voltage and the first current is different than the second current.

27. An electric vehicle comprising:
 a hydrocarbon engine coupled with a generator, the generator comprising a positive source connection and a neutral source connection;
 a plurality of interconnected electro-chemical batteries, each electro-chemical battery comprising a positive terminal and a neutral terminal;
 a switching subsystem configured to successively electrically connect each electro-chemical battery to the generator for 0.003 seconds in a repeating cycle, the switching subsystem comprising a micro-processor for controlling a positive and a neutral electromechanical relay for each electro-chemical battery, wherein the positive source connection of the generator is connected to one side of a positive electromechanical relay and the other side of the positive electromechanical relay is connected to the positive terminal of one of the electro-chemical batteries and the neutral source connection of the generator is connected to one side of a neutral electromechanical relay and the other side of the neutral electromechanical relay is connected to the neutral terminal of the same electro-chemical battery; and
 a motor for propelling the vehicle, the motor connected to and drawing power from the plurality of interconnected electro-chemical batteries.

28. A method for powering an electric vehicle comprising:
 providing a hydrocarbon engine coupled with a generator;
 providing a plurality of electrical energy storage devices;
 providing a motor to power the vehicle;
 selecting an individual electrical energy storage device from the plurality of electrical energy storage devices;
 connecting the individual electrical energy storage device to the hydrocarbon engine coupled with the generator to charge the individual electrical energy storage device;
 continuously cycling through charging the plurality of electrical energy storage devices by successively selecting individual electrical energy storage devices from the plurality of electrical energy storage devices and successively connecting the individual electrical energy storage devices to the hydrocarbon engine coupled with the generator to charge the individual electrical energy storage devices; and
 discharging the plurality of electrical energy storage devices to power the motor.

\* \* \* \* \*